J. C. STODDARD.
Rotary Cultivator.
No. 23,407.
Patented Mar. 29, 1859.
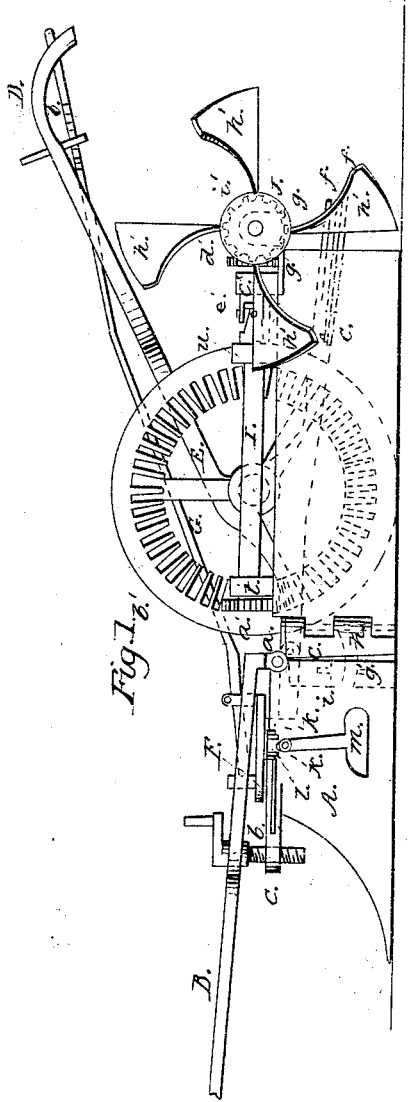
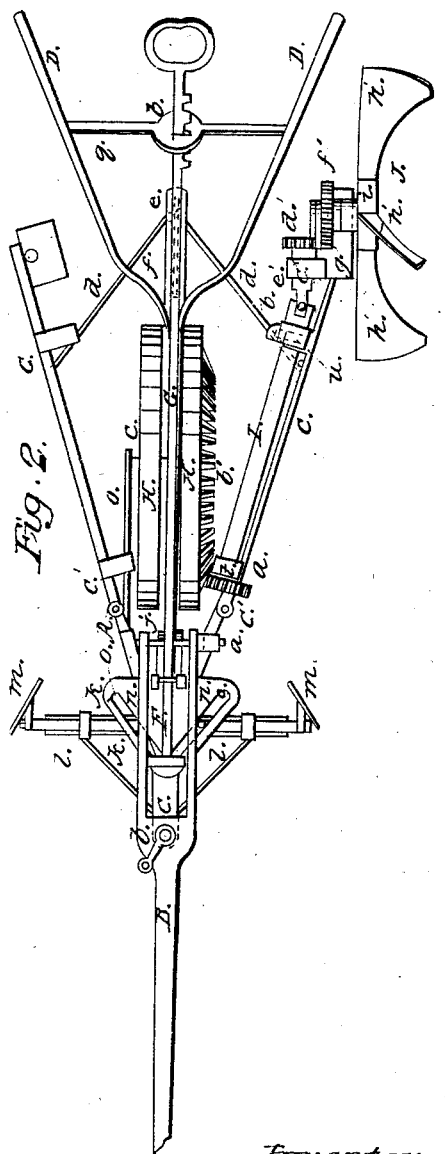
Witnesses:
R. H. Cronningham
Wm Tusch
Inventor:
J. C. Stoddart

UNITED STATES PATENT OFFICE.

J. C. STODDARD, OF WORCESTER, MASSACHUSETTS.

IMPROVEMENT IN CULTIVATORS.

Specification forming part of Letters Patent No. 23,407, dated March 29, 1859.

*To all whom it may concern:*

Be it known that I, J. C. STODDARD, of Worcester, in the county of Worcester and State of Massachusetts, have invented a new and Improved Cultivator; and I do hereby declare that the following is a full, clear, and exact description of the same, reference being had to the annexed drawings, making a part of this specification, in which—

Figure 1 is a side view of my invention; Fig. 2, a plan or top view of the same.

Similar letters of reference indicate corresponding parts in the two figures.

This invention consists in the employment or use of a share with adjustable wings or blades arranged relatively with a driving or supporting wheel, as hereinafter shown and described, in order to facilitate the manipulation of the machine and place the same under the perfect control of the attendant.

The invention also consists in the employment or use of adjustable rotating scrapers attached to the wings or blades and arranged to operate as hereinafter described; and also in the employment or use of lateral adjustable weeding-hoes, in combination with the share and wings or blades.

The object of the invention is to obtain a very simple and efficient horse-hoe cultivator for cultivating all "hoed" crops—one that is capable of being adjusted to suit all work within the scope of its capacity.

To enable those skilled in the art to fully understand and construct my invention, I will proceed to describe it.

A represents a double share, which may be constructed in the usual way, and B is a draft-pole, the back end of which is attached to the back and upper part of the share A by a joint-rod, $a$, a regulating-screw, $b$, passing through the draft-pole and through a bar, $c$, attached to the upper part of the share.

The draft-pole may be adjusted higher or lower by turning the screw $b$, as will be clearly understood by referring to Fig. 1.

To the back end of each side of the share A a wing or blade, C, is attached by a hinge-joint, $c'$, and to the inner side of each wing or blade, near its back end, a link, $d$, is attached, the outer ends of said links being connected by a joint, $e$, which is fitted between parallel bars $f$, and secured at any desired point by a pin, $g$, the wings or blades being more or less expanded by adjusting the joint $e$ farther in or out between the bars $f$. This will be fully understood by referring to Fig. 2.

The hinge-joints $c'$ are not rigidly attached to the back parts of the wings or blades. They are secured thereto at their upper ends by the joint-rod $a$, so as to admit of the wings or blades being adjusted higher or lower, the rod $a$ serving as a center. The wings or blades are secured at any desired point by pins $g'$, which pass through perforated bars $h$, attached to the share, and through eyes $i$, attached to the hinge-joints. (See dotted lines, Fig. 1.)

D represents the handles of the machine. These handles are attached to a bar, E, the front end of which is connected by a joint, $j$, to the back part of the share A, the parallel bars $f$ being also attached to said bar E.

On the upper part of the share A two guide-bars, $k\ k$, are placed transversely, and having between them two sliding bars, $l\ l$, to the outer end of each of which a share, $m$, is attached. To the upper surface and near the inner end of each bar $l$ a pin, $n$, is attached, and these pins are fitted in oblique slots $o\ o$ in a sliding plate, F, placed on the upper part of the share A, and having a rod, G, attached to it, which rod extends back through a guide, $p$, in a cross-bar, $q$, attached to the two handles D.

H H are two wheels, which are placed on an axis, $r$, attached to a curved support, $s$, which is secured to the back part of one of the sides of the share A. The bar E and rod G pass between the wheels H H. The axis $r$ of the wheels may be adjusted higher or lower in the support $s$, as may be desired.

On the upper part of each wing or blade C C a shaft, I, is placed. The front ends of these shafts are fitted in bearings $t$, which are allowed to turn, and the back parts of the shafts are fitted in bearings $u$, which are placed in curved slots in plates $v$, the bearings $u$ being secured at the proper point in said plates by screws or any proper means. On the front ends of the shafts I pinions $a'$ are placed, one on each, and these pinions gear into cogs $b'$ on the sides of the wheels H, said cogs being quite long, so as to admit of the expansion of the wings or blades and still allow the pinions $a'$ to remain in gear. On the back end of each shaft I the axis $c'$ of a pinion, $d'$, is attached by a universal joint, $e'$. The pinions $d'$ gear into pinions $f'$, the bearings of which, as well as those of the pinions $d'$, are attached to plates $g'$, which are pivoted on the back parts of the wings or blades C. On the outer end of the axis of each pinion $f'$ a scraper-wheel, J, is placed, said wheel being formed of a series of screw-shaped flanges, $h'$, attached to a hub, $i'$.

It will be seen that the scraper-wheels J may, on account of the universal joints $e'$, be adjusted parallel with the line of draft, or more or less obliquely with it, as may be desired; and it will also be seen that the shares $m$ may be adjusted farther in or out from the share A by actuating the rod G, the sliding plate F, with its oblique slots $o$ $o$, in which the pins $u$ $u$ fit, effecting such result. As the machine is drawn along the share A and wings C C plow up the soil between the hills or drills, the shares $m$ eradicating any weeds that may be in close proximity to the plants, and the scraper-wheels J loosen the soil, and by their rotation cast more or less earth to the plants, as may be desired, the amount of earth cast toward the plants being regulated by adjusting the flanges $h'$, and also the wheels J, the flanges also, as well as the wings or blades C, being adjusted higher or lower bodily, by means of the attachment to the share A, by the hinge-joints $c'$. The wheels H H, owing to their relative position with the share A and wings or blades C C, permit the attendant or operator to readily guide the machine and to have the most perfect control over it.

I do not claim separately the share A, with adjustable or expanding wings or blades C C attached, for that has been previously used. Neither do I claim the shares $m$, for they also have been previously used; but,

Having thus described my invention, what I claim as new, and desire to secure by Letters Patent, is—

1. The share A and wings or blades C C, arranged relatively with the wheel or wheels H H—that is to say, placing the wheel or wheels behind the share A, and between the wings or blades C C, substantially as and for the purpose set forth.

2. The adjustable rotating scrapers J, applied to the wings or blades C, and arranged to operate as and for the purpose set forth.

3. The combination of the lateral adjustable hoes $m$, share A, adjustable wings or blades C C, rotating scrapers J, wheels H, one or more, arranged for joint operation substantially as and for the purpose set forth.

J. C. STODDARD.

Witnesses:
RICHARD H. CROSSINGHAM,
WM. LURSET.